United States Patent [19]
Glotin et al.

[11] Patent Number: 5,342,886
[45] Date of Patent: Aug. 30, 1994

[54] ALPHA-MONOOLEFINIC GRAFT COPOLYMERS

[75] Inventors: Michel Glotin, Serquigny; Roland Parsy, Le Havre; Patrick Abadie, Bernay, all of France

[73] Assignee: Atochem, Puteaux, France

[21] Appl. No.: 806,773

[22] Filed: Dec. 11, 1991

Related U.S. Application Data

[63] Continuation of Ser. No. 698,190, May 6, 1991, abandoned, which is a continuation of Ser. No. 328,450, Mar. 24, 1989, abandoned.

[30] Foreign Application Priority Data

Mar. 24, 1988 [FR] France ............... 88 03877

[51] Int. Cl.$^5$ .............................. C08L 77/00
[52] U.S. Cl. ................... 525/66; 525/63; 525/68; 525/179
[58] Field of Search ................. 525/66, 179

[56] References Cited

U.S. PATENT DOCUMENTS

| | | |
|---|---|---|
| 2,975,128 | 9/1954 | Stott . |
| 3,005,795 | 10/1961 | Busse et al. . |
| 3,264,371 | 8/1966 | Gruber et al. . |
| 3,274,289 | 9/1966 | Murdock et al. . |
| 3,388,186 | 6/1968 | Kray et al. . |
| 3,465,059 | 9/1969 | Seven et al. . |
| 3,471,426 | 10/1969 | Hofton . |
| 3,498,941 | 3/1970 | Hofton et al. . |
| 3,639,502 | 2/1972 | Okazaki et al. . |
| 3,668,274 | 6/1972 | Owens et al. . |
| 3,821,171 | 6/1974 | Beaton . |
| 3,845,163 | 10/1974 | Murch . |
| 3,984,609 | 10/1976 | Branlard et al. ............ 526/78 |
| 4,017,557 | 4/1977 | Hammer et al. ............ 525/66 |
| 4,148,846 | 4/1979 | Owens et al. ............ 525/66 |
| 4,174,358 | 11/1979 | Epstein ............ 525/183 |
| 4,255,539 | 3/1981 | Branlard ............ 525/330 |
| 4,678,848 | 7/1987 | Walter ............ 526/220 |
| 4,879,341 | 11/1989 | Tsumiyama et al. ............ 525/66 |
| 4,945,129 | 7/1990 | Mason et al. ............ 525/66 |
| 5,010,138 | 4/1991 | Westeppe et al. ............ 525/183 |

FOREIGN PATENT DOCUMENTS

| | | |
|---|---|---|
| 998439 | 7/1965 | United Kingdom . |
| 1047069 | 11/1966 | United Kingdom . |
| 1241361 | 8/1971 | United Kingdom . |
| 1279836 | 6/1972 | United Kingdom . |
| 1423022 | 1/1976 | United Kingdom . |

OTHER PUBLICATIONS

Modern Plastics Encyclopedia, vol. 51, No. 10A, Oct. 1974, pp. 551–552 & 558–559.

*Primary Examiner*—Ana L. Carrillo
*Attorney, Agent, or Firm*—Burns, Doane, Swecker & Mathis

[57] ABSTRACT

Novel graft copolymers, well adopted for compatibilizing at least two normally incompatible thermoplastic polymers, include the copolymerizates of at least one monoamino-substituted polyamide oligomer and an α-monoolefin polymer or copolymer having grafted thereon a monomer which is reactive with the amine functional group of the monoamino-substituted polyamide oligomer.

4 Claims, No Drawings

ALPHA-MONOOLEFINIC GRAFT COPOLYMERS

This application is a continuation of application Ser. No. 07/698,190, filed May 6, 1991, now abandoned, which is a continuation of application Ser. No. 07/328,450, filed Mar. 24, 1989, now abandoned.

BACKGROUND OF THE INVENTION

1. Field of the Invention

The present invention relates to novel α-monoolefin based graft copolymers, to a process for the production thereof and to the use of such novel copolymers, particularly as agents for compatibilizing at least two normally incompatible thermoplastic polymers.

2. Description of the Prior Art

It is known to this art to compatibilize two normally incompatible polymers, in certain specific mixtures, by combining them with a third polymer, which is partially compatible with each of such polymers.

Thus, for example, various third polymers have been proposed for polypropylene/polyamide mixtures:

In the Japanese Patent (Mitsubishi Rayon) published under No. 70-030943, a composition is described comprising polypropylene, polyamide and polypropylene grafted with maleic anhydride.

In the Japanese Patent (Mitsui) published under No. 59-149940, a composition was claimed containing polypropylene, polyamide and an ethylenepropylene copolymer grafted with maleic anhydride.

In the French patent (Mitsubishi Rayon) published under No. FR 2,107,538, a composition is described including polypropylene and glass fiber-reinforced polyamide, and rendered compatible by adding thereto a propylene/α-olefin/polyamide graft copolymer. This graft copolymer is prepared by polycondensation of an aminoacid in the presence of propylene copolymer previously grafted with maleic anhydride.

In the Japanese Patent (Toa Gosei/Mitsui Toatsu) published under No. 60-233131, a graft copolymer is described for making compatible a mixture of polypropylene and polyvinyl chloride. This graft copolymer is prepared by reacting a polypropylene modified with 2 to 20% by weight of maleic anhydride with a polymethyl methacrylate having a terminal hydroxyl group.

SUMMARY OF THE INVENTION

A major object of the present invention is the provision of novel graft copolymers comprising at least one monoamino-substituted polyamide oligomer and an α-monoolefin polymer (or copolymer) having grafted thereon a monomer which is reactive with an amine functional group of the monoamino-substituted polyamide oligomer.

Another object of this invention is the provision of a process for the production of such novel graft copolymers by free-radical grafting, onto a polymer backbone containing recurring structural units derived from α-monoolefin, of a monomer which is reactive with an amine functional group, and then by reacting a monoamino-substituted polyamide oligomer with the graft copolymer.

Another object of this invention is the provision of compatible compositions of matter by formulating the above novel graft copolymers with at least two mutually incompatible thermoplastic polymers, at least one of which is compatible with the α-monoolefin polymer or copolymer.

Briefly, the novel copolymers of the present invention are graft copolymers having the general formula $A_aM_bX_cP_d$ in which:

$A_aM_b$ is the (co)polymer backbone;

$X_cP_d$ denotes the polymers grafted onto the (co)polymer backbone;

A is a recurring unit of an α-monoolefin containing from 2 to 8 carbon atoms, preferably a propylene recurring unit;

M is selected from among:

(i) recurring units of an α-monoolefin containing from 2 to 8 carbon atoms, preferably ethylene recurring units;

(ii) recurring units of several α-monoolefins as above defined, which may merely be mixed together or which may be randomly copolymerized or block copolymerized, and one of such α-monoolefins is preferably ethylene;

(iii) recurring units of a comonomer which is copolymerizable with one of the α-monoolefins as above defined, for example an alkyl acrylate;

the recurring units A and M which comprise said (co)polymer backbone are randomly copolymerized or block copolymerized, or are simple mixtures;

X is a recurring unit of a monomer which can be grafted by a free-radical mechanism onto an α-monoolefin homo- or copolymer and containing a functional group which is reactive with an amino-substituted recurring unit;

P is derived from a polyamide oligomer of the formula:

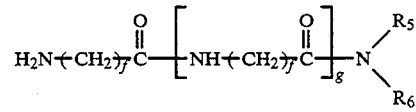

in which f is a number ranging from 3 to 11; g is a number ranging from 5 to 80 and preferably from 15 to 55; $R_5$ is hydrogen or a linear or branched chain alkyl radical containing up to 20 carbon atoms; and $R_6$ is a linear or branched chain alkyl or alkenyl radical containing up to 20 carbon atoms, a saturated or unsaturated cycloaliphatic radical, an aromatic radical, or combination thereof;

a is a number ranging from 0 to 5,000 and preferably from 350 to 2,000;

b is a number and the sum a+b ranges from 350 to 45,000 and preferably from 500 to 10,000;

c is a number such that the ratio by weight of the monomer X grafted onto the (co)polymer backbone to the copolymer grafted with X ranges from 500 ppm to 10%, preferably less than 2%, and more preferably from 5,000 ppm to 1.5%; and d is a number other than zero and less than or equal to c, and preferably at least equal to 0.3 c.

DETAILED DESCRIPTION OF THE PREFERRED EMBODIMENTS OF THE INVENTION

More particularly according to the present invention, by "(co)polymer backbone" of the formula:

in which a, b, A and M are as above defined, is intended any polymer comprising A and B recurring units derived from monomers which have been randomly polymerized or block polymerized, or, as the case may be, any mixture of polymers produced by separate polymerizations of monomers from which the A and M units are derived.

This copolymerization or admixing may be carried out in accordance with known procedures.

For example, the copolymerization of propylene and the α-olefin in the presence of a Ziegler catalyst or a coordination catalyst is representative.

The graft copolymer according to the invention can be prepared by free-radical grafting, onto the (co)polymer backbone, of a monomer which is reactive with an amine functional group, and then by reacting the oligomer with the previously grafted (co)polymer.

The monomer X which is grafted by a free-radical mechanism onto the (co)polymer backbone and which has a functional group which is reactive with an amine functional group advantageously has one of the following formulae:

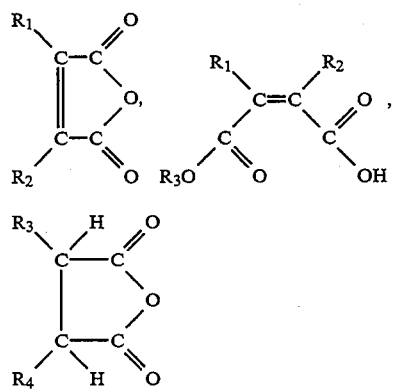

in which:

$R_1$ and $R_2$ are either hydrogen, or a linear or branched chain alkyl radical containing up to 8 carbon atoms, at least one of these symbols being hydrogen;

$R_3$ is hydrogen or a linear or branched chain alkyl radical containing up to 10 carbon atoms; and $R_4$ is a linear or branched chain alkenyl radical containing up to 12 carbon atoms.

The preferred monomers X are citraconic anhydride, fumaric acid, mesaconic acid, the anhydride of 3-allyl-succinic acid and, most preferably, maleic anhydride.

The grafting of the monomer X onto the (co)polymer backbone by a free-radical mechanism, is carried out in the presence of a free-radical initiator, advantageously dicumyl peroxide, benzoyl peroxide or 2,5-dimethyl-2,5-di(tert-butylperoxy)hexane.

Normally, the initiator is used in a proportion of $2.5 \times 10^{-4}$ to $4 \times 10^{-2}$ by weight relative to the weight of the (co)polymer.

The free-radical grafting of the monomer X onto the (co)polymer backbone may be carried out in the molten state or in solution in a solvent for the (co)polymer backbone. Exemplary solvents of this type are toluene, xylene and chlorobenzene.

The solution grafting technique is particularly recommended when a degree of grafting greater than 1.5% is desired. (Ratio by weight of the grafted monomer X to the (co)polymer backbone grafted with X).

The (co)polymer backbone, the monomer X and the free-radical polymerization initiator are added to a solvent for the (co)polymer. The mixture is brought to a temperature such that thermal decomposition of the free-radical initiator takes place, such that the grafting reaction occurs. Generally, the duration of this reaction ranges from 0.5 to 10 times, and preferably from 1 to 4 times the duration of the half-life of the free-radical initiator at the reaction temperature.

Generally, the temperature of thermal decomposition of the free-radical initiator ranges from 90° to 200° C., and preferably from 110° to 140° C.

The technique of free-radical grafting of the monomer X onto the (co)polymer backbone in the molten state is particularly well-suited when a degree of grafting of from 500 ppm to 1.5% is required.

Free-radical grafting in the molten state entails mixing the (co)polymer backbone with the selected amounts of monomer X and free-radical initiator, for example in an extruder. The mixture is brought to a temperature which generally ranges from 170° to 250° C., and preferably from 180° to 200° C.

The average residence time of the molten material in the extruder normally ranges from 15 seconds to 3 minutes, and preferably from 40 to 80 seconds.

The degree of grafting of the monomer X onto the (co)polymer backbone can be measured by analysis of the anhydride functional groups by infrared spectrophotometry.

The monoamino-substituted polyamide oligomer, P, of the formula:

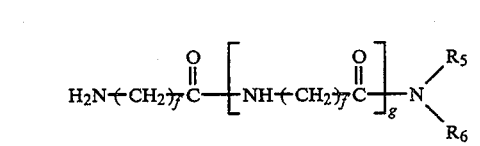

in which f, q, $R_5$ and $R_6$ are as above defined, is subsequently reacted with, and incorporated into, the graft (co)polymer.

This monoamino-substituted polyamide oligomer can be prepared by polycondensation of an aminoacid of the formula:

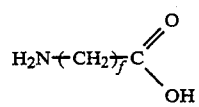

or a polyaddition of a lactam of the formula:

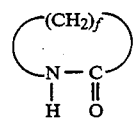

in which f is as defined above in the presence of a monofunctional polymerization regulator of the formula:

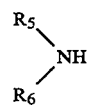

in which $R_5$ and $R_6$ are as defined above.

The aminoacid or lactam monomers preferred for the synthesis of the monoamino-substituted oligomers according to the invention are advantageously caprolactam, 11-aminoundecanoic acid and dodecalactam.

The preferred monofunctional polymerization regulators are laurylamine and oleylamine.

The polycondensation described above is carried out in accordance with conventionally known processes, for example at a temperature generally ranging from 200° to 300° C., under vacuum or in an inert atmosphere, with stirring of the reaction mixture.

The average chain length of the oligomer is determined by the initial molar ratio between the polycondensable monomer or the lactam and the monofunctional polymerization regulator.

To calculate the average chain length, one molecule of chain regulator is normally counted for one oligomer chain.

The addition of the monoamino-substituted polyamine oligomer onto the (co)polymer backbone grafted with a monomer X is carried out by reacting an amine functional group of the oligomer with at least one anhydride or acid functional group of the graft (co)polymer. Amide or imide linkages are thus created.

The addition of the oligomer P onto the graft (co)polymer backbone is preferably carried out in the molten state. Thus, it is possible to knead the oligomer and the (co)polymer at a temperature generally ranging from 230° to 250° C. in an extruder. The average residence time of the molten material in the extruder typically ranges from 15 seconds to 5 minutes, and preferably from 1 to 3 minutes.

The addition of the oligomer onto the graft (co)polymer backbone is evaluated by selective extraction of the free polyamide oligomers, namely, those oligomers which have not reacted to form the final graft copolymer.

The α-monoolefin graft copolymers according to the invention have the following advantages in relation to the "third polymers" described in the literature:

(a) It is possible to control the degree of grafting of the polyamide oligomer onto the graft (co)polymer and thus to have more complete control of the structure of the graft copolymer;

(b) It is possible to adjust and control the average molecular weight of the monoamino-substituted polyamide oligomer. Indeed, the average molecular weight of the polyamide oligomer is a determining factor for the activity and the effectiveness of the graft copolymer according to the invention as a compatibility agent for alloys of incompatible polymers;

(c) The graft copolymers according to the invention do not have any chain ends which are reactive in the context of polycondensation, and during the kneading of the components of the alloy with the graft copolymer according to the invention, said chain ends will not react in an uncontrolled manner.

The graft copolymer according to the invention permits, in particular, at least two mutually incompatible thermoplastic polymers to be homogeneously combined, one of which, however, is compatible with the polyamide oligomer component of said copolymer and the other of which is compatible with the (co)polymer backbone.

The graft copolymer may be incorporated in the usual manner into the mixture of thermoplastic resins, in the molten state, in a kneading device. The amount of copolymer introduced may range from 0.1 to 30% and preferably from 5 to 15% by weight relative to the weight of the mixture of thermoplastic resins.

Exemplary of polymers or thermoplastic resins which are compatible with the polyamide oligomers comprising the graft copolymer, the following are particularly representative:

(i) aliphatic polyamides, such as polyamides 6, 11 or 12;

(ii) semiaromatic polyamides and particularly those described in French Patents FR 1,588,130, 2,324,672 and 2,575,756, in European Patent EP 53,876, and in Japanese Patents 60,217,237 and 59,015,447;

(iii) block copolymerized polyetheresteramides or block copolymerized polyetheramides, and particularly the polymers described in U.S. Pat. Nos. 4,332,920 and 4,331,786;

(iv) hydrolyzed ethylene/vinyl acetate copolymers;

(v) resins comprising phenolic units, such as polypara-vinylphenol.

It will be appreciated that, by the designation "polymers", are included coplymers to the extent that the content of compatible units of the copolymer is adequate to maintain compatibility.

The designation "polymers" are included mixtures of polymers, or copolymers, with various additives (impact modifiers, inorganic fillers, glass fibers, pigments and the like).

As examples of thermoplastic polymers which are compatible with the (co)polymer backbone, particularly representative are polypropylene, polyethylene or ethylene/propylene copolymers.

By virtue of the compatibility imparted by the novel copolymers of this invention, it is possible to formulate improved alloys such as:

| | |
|---|---|
| Polyamide 6 | polypropylene; |
| Polyamide 6 | polyethylene; |
| Polyamide 6 | ethylene/propylene copolymer; |
| Polyamide 11 or 12 | polypropylene or polyethylene or ethylene/propylene copolymer; |
| Hydrolyzed ethylene/vinyl acetate copolymer | polypropylene or polyethylene or ethylene/propylene copolymer; |
| Polypara-vinylphenol | polypropylene or polyethylene or ethylene/propylene copolymer; |
| Block polyetheramide | polypropylene or polyethylene or ethylene/propylene copolymer; |
| Semiaromatic polyamide | polypropylene or polyethylene or ethylene/propylene copolymer. |

The compatibility imparted by the graft coploymer according to the invention is shown by electron microscopy and by the mechanical properties of the product resulting from the mixture of the imcompatible thermoplastic polymers.

The morphology of a mixture of thermoplastic polymers without the graft copolymer according to the invention, examined by electron microscopy, generally appears in the form of large nodules of one polymer surrounded by the matrix formed by the other polymer, the adhesion between the nodules and the matrix being substantially nonexistent. The addition of the graft copolymer causes a significant diminution the size of the nodules. A strong adhesion between the visible phases is also observed as the nodules being coated by the matrix. Under these conditions, there is formed what may be deemed an "alloy", by analogy with metallurgical structures, as distinct from simple mixtures.

The mechanical properties of thermoplastic alloys of this type are at least equal to those of the components, weighted by the volume fraction of each component, and in certain cases greater than those of the two components, for example impact strength.

In contrast with these alloys according to the invention, simple mixtures of the same mutually incompatible polymers, without the effect of the graft copolymer according to the invention, have mechanical properties which are generally close to those of the component having the lowest performance.

In order to further illustrate the present invention and the advantages thereof, the following specific examples are given, it being understood that same are intended only as illustrative and in nowise limitative.

EXAMPLE 1

A. Synthesis of the graft copolymer backbone X

Into a WERNER extruder, a mixture was continuously introduced which comprised, by weight, 100 parts of propylene/ethylene block copolymer (containing 12% by weight of ethylene, of melt index=5, of melting point=163° C.), 1.6 parts of maleic anhydride and 1.7 parts of 2,5-dimethyl-2,5-di(tert-butylperoxy)-hexane dissolved in one part of chlorobenzene.

The mixture was brought to 200° C. and the rotational speed of the screw was 100 revolutions/minute.

Devolatilization of the mixture was then carried out before entry into the die in order to remove chlorobenzene and the maleic anhydride which had not reacted.

At the die outlet, a sample of the graft polymer was withdrawn, which was dissolved in xylene and then precipitated in acetone in order to purify same.

By analysis of the anhydride functions by infrared spectrophotometry, 1.16% by weight of grafted anhydride was determined.

By gel permeation chromatography, it was determined that the number-average molecular weight was equal to 32,000.

B. Synthesis of the polyamide oliqomer (P)

Into a 100-liter stainless steel reactor, were introduced 31 kg of caprolactam, 0.91 kg of laurylamine and 3.5 liters of water.

After purging the reactor with nitrogen, it was heated in the closed state for 2 hours at 250° C., while stirring at 35 revolutions/minute. The pressure of the atmosphere in the reactor was subsequently reduced over 1 hour.

After the reactor had been purged with nitrogen for 15 minutes, the oligomer was poured into water, centrifuged, washed with water at 80° C., then dried for 16 hours in a vacuum oven at 80° C.

In this manner, a polyamide oligomer was obtained whose number average molecular weight was 5,700, determined by potentiometric analysis of the terminal amine functional groups.

C. Preparation of the graft copolymer

A mixture comprising, by weight, 59.8 parts of the graft copolymer backbone described under A and 40.2 parts of the oligomer described under B was kneaded in the molten state in a WERNER ZSK30 extruder.

The mixture was brought to 240° C.

The average residence time of the mixture in the extruder was about 3 minutes.

At the outlet of the extruder, a sample of material was withdrawn which was introduced to an extractor of the KUMAGAWA type.

In this manner, the polyamide oligomers which had not reacted with the anhydride functional groups of the maleinated copolymer were selectively extracted with formic acid. By this method, a degree of condensation of the polyamide oligomer onto the graft (co)polymer of 65% was determined.

The graft copolymer thus obtained can be represented by the formula:

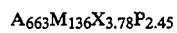

$$A_{663}M_{136}X_{3.78}P_{2.45}$$

in which A is a propylene recurring, unit;
M is a ethylene recurring unit;
X is a maleic anhydride recurring unit;
P is an oligomer of caprolactam with $\overline{M}n=5700$.

EXAMPLE 2

Into a WERNER extruder was continuously introduced a mixture comprising, by weight, 33 parts of polypropylene, parts of polyamide 6 and 10 parts of the maleinated copolymer backbone described in Example 1.A (SAMPLE 1).

The material temperature along the barrel ranged from 255° to 270° C. The rotational speed of the screw was 150 revolutions/minute and the output of material was 20 kg/hour.

Under the same conditions, a mixture was extruded containing, by weight, 33 parts of polypropylene, 57 parts of polyamide 6 and 10 parts of the graft copolymer described in Example 1.C (SAMPLE 2).

Also under the same conditions, a reference mixture was produced containing (by weight) 36.7 parts of polypropylene and 63.3 parts of polyamide 6 (SAMPLE 3).

In the case of the SAMPLES 1, 2 and 3, the polypropylene was a propylene homopolymer having a melt index=3 and a melting point=166° C., and the polyamide 6 was a homopolymer of caprolactam having a melting point=218° C.

SAMPLES 1, 2 and 3 were injection-molded in the form of plaques of dimensions 100×100×3 mm, from which were cut the half-size ISO test pieces conforming to the standard NFT 51034.

Some test pieces were cut in the direction of injection flow (TEST PIECES A); others were cut perpendicularly to the direction of injection flow (TEST PIECES B).

Some test pieces were also molded from the samples in accordance with the standard defined by the Institut Frangais du Caoutchouc (TEST PIECES C).

The test pieces A, B and C were evaluated by tensile elongation in accordance with the standard NFT 51034.

The test pieces from SAMPLE 3 (reference) were extremely brittle: they broke at 5 to 6% elongation. This indicated a coarse and inhomogeneous morphology, as well as a lack of adhesion between the two components of REFERENCE SAMPLE 3.

The test pieces A, B and C from SAMPLE 1 behaved differently: the test pieces A and B had a more brittle behavior than test piece C. This indicated inhomogeneity of the sample, as well as a susceptibility to orientation.

In the case of the three types of test pieces from SAMPLE 2, a homogeneous ductile behavior was observed. This indicated a good homogeneity in SAMPLE 2, as well as a low susceptibility to transformation and orientation.

SAMPLES 1 and 2 were also tested for CHARPY impact strength at ambient temperature, after having been injection-molded into test pieces.

In the case of SAMPLE 1, a breakage rate of 60% was observed.

In the case of SAMPLE 2, none of the test pieces broke under test.

EXAMPLE 3

A. Into a WERNER ZSK30 extruder, a mixture was continuously introduced containing, by weight, 100 parts of an ethylene/propylene block copolymer (containing 12% by weight of ethylene, having a melt index=5, and a melting point=163° C.), 1.5 parts of maleic anhydride and 1.7 parts of 2,5-dimethyl-2,5-di(tert-butylperoxy)hexane dissolved in one part of chlorobenzene.

The extrusion conditions and purification conditions were identical with those described in Example 1.A.

The analysis of the anhydride functional groups by infrared spectrophotometry of a sample of graft copolymer evidenced that 1.02% by weight of anhydride had been grafted.

The number-average molecular weight $\overline{M}_n$ determined by gel permeation chromatography was 19,700.

B. A monoamino-substituted polyamide oligomer was produced under the same conditions as those described in Example 1.B with a ratio by weight of caprolactam to laurylamine equal to 15.7. The number-average molecular weight $\overline{M}_n$ of the oligomer was 2,800.

C. In a WERNER ZSK30 extruder, there was kneaded in the molten state, under the same conditions as those described in Example 1.C, a mixture comprising, by weight, 77 parts of the graft copolymer described above and 23 parts of the polyamide oligomer as described above.

After the extrusion, the degree of condensation of the oligomer onto the graft copolymer backbone was measured under the same conditions as those described in Example 1.C; this was 65.8%.

The graft copolymer thus obtained can be represented by the formula:

$$A_{409}M_{84}X_{2.05}P_{1.35}$$

in which A represents a propylene recurring unit;
M represents a recurring unit;
X represents a maleic anhydride recurring unit; and
P represents a unit derived from an oligomer of caprolactam having $\overline{M}_n=2,800$.

EXAMPLE 4

A mixture comprising, by weight, 50 parts of polypropylene and 50 parts of hydrolyzed ethylene/vinyl acetate copolymer (EVOH) was brought to 220° C. and kneaded in the chamber of a BRABENDER plastograph for 30 minutes at a mixing speed of 50 revolutions/minute (SAMPLE 4).

A mixture comprising, by weight, 49 parts of polypropylene, 49 parts of EVOH and 2 parts of the maleinated ethylene/propylene copolymer backbone described in Example 3.A, was kneaded under the same conditions as above (SAMPLE 5).

A mixture was also produced under the same conditions, containing, by weight, 49 parts of polypropylene, 49 parts of EVOH and 2 parts of the graft copolymer described in Example 3.C (SAMPLE 6).

In the case of SAMPLES 4, 5 and 6, the polypropylene had a melt index equal to 5 and a melting point equal to 166° C. and the EVOH was such that its ethylene content was 38% (by moles).

SAMPLES 4, 5 and 6 were subsequently examined by scanning electron microscopy (magnification: 2,500×).

Examination of SAMPLE 4 showed that the two polymers had very little compatibility: very disparate nodules of EVOH were distinguished, the diameter of which varied from 11 to 27 μm in the polypropylene matrix. Moreover, it was observed that the adhesion between these nodules of EVOH and the polypropylene matrix was very poor.

Examination of SAMPLE 5 showed a morphology which was quite coarse; nodules of EVOH were distinguished having a diameter between 5.7 and 7 μm, whose adhesion to the polypropylene matrix was poor.

Examination of SAMPLE 6 showed a fine morphology typified by nodules having a diameter of from 1.7 to 2.8 μm and whose adhesion to the polypropylene matrix was very good.

EXAMPLE 5

A mixture comprising, by weight, 50 parts of polypropylene and 50 parts of polypara-vinylphenol (PPVP) was brought to 200° C. and kneaded in the chamber of a BRABENDER plastograph for 15 minutes at a mixing speed of 50 revolutions/minute (SAMPLE 7).

A mixture comprising, by weight, 49 parts of propylene, 49 parts of polypara-vinylphenol and 2 parts of the maleinated ethylene/propylene copolymer described in Example 3.A, was kneaded under the same conditions as above (SAMPLE 8).

A mixture was also prepared under the same conditions comprising, by weight, 49 parts of polypropylene, 49 parts of polypara-vinylphenol and 2 parts of the graft copolymer described in Example 3.C (SAMPLE 9).

In the case of SAMPLES 7, 8 and 9, the polypropylene had a melt index equal to 5 and a melting point equal to 166° C. and the polypara-vinylphenol was an oligomer whose weight-average molecular weight was 4,000 and whose melting point ranged from 160° to 200° C.

SAMPLES 7, 8 and 9 were subsequently examined by scanning electron microscopy (magnification: 2,500×).

Examination of SAMPLE 7 showed a coarse morphology in which localized cocontinuous phases were found or ovoid nodules of PPVP having an average diameter equal to 30 μm, dispersed in a matrix of PP. The total incompatibility of the two polymers was determined by observing fracture surfaces.

Examination of SAMPLE 8 showed an improved dispersion of the polypara-vinylphenol (PPVP) in the polypropylene. The average size of the nodules of PPVP dispersed in the PP matrix was about 10 μm. The adhesion between the phases was unimproved in relation to SAMPLE 7.

Examination of SAMPLE 9 showed a fine morphology, typified by nodules of PPVP having an average diameter equal to 2 μm, dispersed in the matrix of PP and whose adhesion to this matrix was greatly improved in relation to that of SAMPLES 7 and 8.

EXAMPLE 6

A mixture comprising, by weight, 50 parts of polypropylene and 50 parts of polyetheresteramide was brought to 200° C. and kneaded in the chamber of a BRABENDER plastograph for 15 minutes at a stirring speed of 50 revolutions/minute (SAMPLE 10).

A mixture comprising, by weight, 49 parts of propylene, 49 parts of polyetheresteramide and 2 parts of the maleinated ethylene/propylene copolymer described in Example 3.A, was kneaded under the same conditions as above (SAMPLE 11).

A mixture was also produced under the same conditions comprising, by weight, 49 parts of polypropylene, 49 parts of polyetheresteramide and 2 parts of the graft copolymer described in Example 3.C (SAMPLE 12).

In the case of SAMPLES 10, 11 and 12, the polypropylene had a melt index equal to 5 and a melting point equal to 166° C. and the polyetheresteramide was produced by copolycondensation of $\alpha,\omega$-dicarboxyl-substituted polyamide 12 blocks having $\overline{Mn}=600$, and $\alpha,\omega$-dihydroxyl-substituted polytetramethylene glycol blocks having $\overline{Mn}=2,000$.

SAMPLES 10, 11 and 12 were subsequently examined by scanning electron microscopy (magnification: 2,500×).

Examination of SAMPLE 10 showed a particularly coarse morphology typified by a three-dimensional network.

Examination of SAMPLE 11 did not show any improvement in adhesion, nor any reduction in the size of the three-dimensional network in relation to the examination of SAMPLE 10.

When SAMPLE 12 was examined, a less coarse morphology was observed than that of SAMPLES 10 and 11. The morphology of SAMPLE 12 was no longer typified by a three-dimensional network but by the dispersion of nodules of polyetheresteramide in the matrix of polypropylene.

EXAMPLE 7

A mixture comprising, by weight, 50 parts of polypropylene and 50 parts of amorphous semiaromatic polyamide was brought to 220° C. and kneaded in the chamber of a BRABENDER plastograph for 30 minutes at a mixing speed of 50 revolutions/minute (SAMPLE 13).

A mixture comprising, by weight, 49 parts of polypropylene, 49 parts of amorphous semiaromatic polyamide and 2 parts of the maleinated ethylene/propylene copolymer described in Example 3.A, was kneaded under the same conditions as above (SAMPLE 14).

A mixture was also produced under the same conditions containing, by weight, 49 parts of polypropylene, 49 parts of amorphous semiaromatic polyamide and 2 parts of the graft copolymer described in Example 3.C (SAMPLE 15).

In the case of SAMPLES 13, 14 and 15, the polypropylene had a melt index equal to 5 and a melting point equal to 166° C. and the amorphous semiaromatic polyamide was based on terephthalic acid and 2,2,4-trimethyl-1,6-diaminohexane and 2,4,4-trimethyl-1,6-diaminohexane.

SAMPLES 13, 14 and 15 were subsequently examined by scanning electron microscopy (magnification: =2,500).

Examination of SAMPLE 133 showed an incompatibility between the 2 polymers: nodules of amorphous semiaromatic polyamide were distinguished, whose average diameter was 30 $\mu$m, dispersed in the matrix of polypropylene. Moreover, adhesion between the nodules of amorphous semiaromatic polyamide and the matrix of PP was non-existent.

SAMPLE 14 had quite a coarse morphology; nodules of amorphous semiaromatic polyamide having an average diameter equal to 5 $\mu$m, were dispersed in the matrix of polypropylene. There was moderate adhesion of the nodules to the matrix.

Examination of SAMPLE 15 showed a quite fine morphology characterized by nodules of amorphous semiaromatic polyamide having an average diameter equal to 3.3 $\mu$m and whose adhesion to the matrix of PP was good.

EXAMPLE 8

A mixture comprising, by weight, 50 parts of polypropylene and 50 parts of amorphous semiaromatic polyamide was brought to 280° C. and kneaded in the chamber of a HAAKE plastograph for 20 minutes at a mixing speed of 50 revolutions/minute (SAMPLE 16).

A mixture comprising, by weight, 49 parts of polypropylene, 49 parts of amorphous semiaromatic polyamide and 2 parts of the maleinated ethylene-propylene copolymer described in Example 3.A, was kneaded under the sale conditions as above (SAMPLE 17).

A mixture was also produced under the same conditions containing, by weight, 49 parts of polypropylene, 49 parts of amorphous semiaromatic polyamide and 2 parts of the graft copolymer described in Example 3.C (SAMPLE 18).

In the case of SAMPLES 16, 17 and 18, the polypropylene had a melt index equal to 5 and a Belting point equal to 166° C.; the amorphous semiaromatic polyamide was based on isophthalic acid, 4,4,'-diamino-3,3'-dimethyldicyclohexylmethane and lauryllactam.

SAMPLES 16, 17 and 18 were subsequently examined by scanning electron microscopy (magnification: ×2,500).

Examination of SAMPLE 16 showed an incompatibility between the 2 polymers: nodules of amorphous semiaromatic polyamide were distinguished, whose average diameter was 20 $\mu$m dispersed in the matrix of polypropylene. Moreover, adhesion between the nodules of amorphous semiaromatic polyamide and the matrix of PP was non-existent.

Examination of SAMPLE 17 showed a quite coarse morphology: nodules of amorphous semiaromatic polyamide having an average diameter equal to 10 $\mu$m were dispersed in the matrix of polypropylene. There was moderate adhesion of the nodules to the matrix.

Examination of SAMPLE 18 showed a quite fine morphology characterized by nodules of amorphous semiaromatic polyamide having an average diameter equal to 3.5 $\mu$m and whose adhesion to the matrix of polypropylene was good.

EXAMPLE 9

Into a WERNER extruder, a mixture was continuously introduced comprising, by weight, 26 parts of polypropylene, 67 parts of polyamide 6 and 7 parts of the maleinated ethylene/propylene copolymer described in Example 3-A (SAMPLE 19).

The temperature of the material along the barrel ranged from 260° C. to 290° C. The rotational speed of the screw was 150 revolutions/minute and the output of material was 20 kg/hour.

A mixture was extruded under the same conditions comprising, by weight, 26 parts of polypropylene, 67 parts of polyamide 6 and 7 parts of the graft copolymer described in Example 1.C (SAMPLE 20).

A reference mixture was produced, also under the same conditions, containing (by weight) 32.7% of polypropylene and 67.3% of polyamide 6.

In the case of SAMPLES 19, 20 and 21, the polypropylene was a polypropylene homopolymer having a melt index of 12 and a melting point of 166° C., and the polyamide 6 was a homopolymer of caprolactam having a melting point of 218° C.

SAMPLES 19, 20 and 21 were injection-molded in the form of a test pieces having dimensions 127×12.7×6.4 mm and their IZOD impact strength was evaluated in accordance with ISO standard at 23° C. and at 40° C. The results of this evaluation are reported in the following Table:

TABLE

| SAMPLE | IZOD IMPACT STRENGTH | |
|---|---|---|
| | 23° C. | 40° C. |
| 19 | 6 | 9 |
| 20 | 10.5 | 13 |
| 21 | 2 | 3 |

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A polymer alloy comprising a polyamide, a polyolefin incompatible with the polyamide and a compatibilizing amount of a graft copolymer having the formula $A_aM_bX_cP_d$ in which:

$A_aM_b$ is the (co)polymer backbone;
   $X_cP_d$ denotes the polymers grafted on the (co)polymer backbone;
   A is a recurring unit of an α-monoolefin containing from 2 to 8 carbon atoms;
   M is selected from among:
   (i) recurring units of an α-monoolefin containing from 2 to 8 carbon atoms; or
   (ii) recurring units of a plurality of α-monoolefins as defined above;
   X is a recurring unit of a monomer which can be grafted by a free-radical mechanism onto an α-monoolefin homo- or copolymer and containing a functional group which is reactive with an amino-substituted recurring unit;
   P is derived from a polyamide oligomer of the formula:

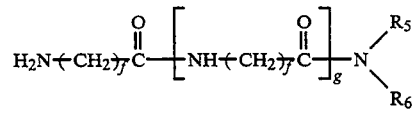

in which f is a number ranging from 3 to 11; g is a number ranging from 5 to 80; $R^5$ is hydrogen or a linear or branched chain alkyl radical containing up to 20 carbon atoms; and $R^6$ is a linear or branched chain alkyl or alkenyl group containing up to 20 carbon atoms, a saturated or unsaturated cycloaliphatic radical, an aromatic radical, or combination thereof;
   a is a number ranging from 0 to 5,000;
   b is a number from 0 to 45,000 and the sum a+b ranges from 350 to 45,000;
   c is a number such that the ratio by weight of the monomer X grafted on the (co)polymer backbone to the copolymer grafted with X ranges from 500 ppm to 10%; and
   d is a number other than zero or less than or equal to c.

2. The polymer alloy as defined by claim 1, said at least two incompatible polymers comprising an aliphatic (co)polyamide/(co)polymer of propylene, ethylene or both propylene and ethylene; semiaromatic (co)polyamide/(co)polymer of propylene, ethylene or both propylene and ethylene; or block polyetheramide/(co)polymer of propylene, ethylene or both propylene and ethylene.

3. The polymer alloy as defined by claim 1, said at least two incompatible polymers comprising polyamide 6/polypropylene; polyamide 6/polyethylene; polyamide 6/ethylene/propylene copolymer; polyamide 11 or 12/polypropylene or polyethylene or ethylene/propylene copolymer; block polyetheramide/polypropylene or polyethylene or ethylene/propylene copolymer; or semiaromatic polyamide/polypropylene or polyethylene or ethylene/propylene copolymer.

4. The polymer alloy as defined by claim 1, comprising from 0.1 to 30% by weight of said graft copolymer.

* * * * *